United States Patent
Youn et al.

(10) Patent No.: US 7,724,667 B2
(45) Date of Patent: May 25, 2010

(54) ETHERNET LINE CARD AND METHOD OF PROVIDING VARIOUS SERVICES USING THE SAME

(75) Inventors: Ji Wook Youn, Daejeon (KR); Hyung Joo Kim, Daejeon (KR); Jong Hyun Lee, Daejeon (KR)

(73) Assignee: Electronics And Telecommunications Research Institute, Daejeon (KR)

( * ) Notice: Subject to any disclaimer, the term of this patent is extended or adjusted under 35 U.S.C. 154(b) by 393 days.

(21) Appl. No.: 11/633,749

(22) Filed: Dec. 5, 2006

(65) Prior Publication Data

US 2007/0133584 A1 Jun. 14, 2007

(30) Foreign Application Priority Data

Dec. 8, 2005 (KR) .................. 10-2005-0120046
Mar. 9, 2006 (KR) .................. 10-2006-0022260

(51) Int. Cl.
 H04L 12/28 (2006.01)
 H04L 12/56 (2006.01)
 H04L 12/50 (2006.01)
 H04L 12/26 (2006.01)
 H04L 12/66 (2006.01)
(52) U.S. Cl. .............. 370/235; 370/253; 370/392; 370/395.21; 370/419; 370/463
(58) Field of Classification Search ........ 370/395.21, 370/235, 253, 392, 419, 463
See application file for complete search history.

(56) References Cited

U.S. PATENT DOCUMENTS

| 6,014,708 | A | 1/2000 | Klish |
| 6,928,106 | B1 | 8/2005 | Agazzi |
| 7,190,696 | B1 * | 3/2007 | Manur et al. ............. 370/392 |

| 2001/0007560 | A1 * | 7/2001 | Masuda et al. ............. 370/401 |
| 2002/0196784 | A1 * | 12/2002 | Masuda ............. 370/355 |
| 2004/0109414 | A1 * | 6/2004 | Choi et al. ............. 370/230 |
| 2005/0023241 | A1 * | 2/2005 | Goergen ............. 216/13 |

(Continued)

FOREIGN PATENT DOCUMENTS

KR 2001-0085853 9/2001

(Continued)

OTHER PUBLICATIONS

"Arsenic: A User-Accessible Gigabit Ethernet Interface." Ian Pratt et al. © 2001 IEEE Infocom. pp. 67-76.

*Primary Examiner*—Alpus H Hsu
*Assistant Examiner*—Saad Hassan
(74) *Attorney, Agent, or Firm*—Ladas & Parry LLP

(57) ABSTRACT

Provided are an Ethernet line card and a method of providing various services using the same. The Ethernet line card includes: a priority allocation unit setting a priority of a received Ethernet packet according to a pre-set control standard based on header information of the Ethernet packet; a quality of service (QoS) guarantee unit defining a capacity per class based on a pre-set QoS standard, inserting the Ethernet packet into a relevant class, and dropping and managing the Ethernet packet based on the priority if the Ethernet packet exceeds a capacity of the relevant class; and a signal processing unit managing and updating the pre-set control standard and the pre-set QoS standard, receiving results of processing the Ethernet packet from the priority allocation unit and the QoS guarantee unit, and storing the received results.

16 Claims, 3 Drawing Sheets

U.S. PATENT DOCUMENTS

| | | | |
|---|---|---|---|
| 2006/0233130 A1* | 10/2006 | Rajkotia | 370/328 |
| 2007/0050492 A1* | 3/2007 | Jorgensen | 709/223 |
| 2007/0104095 A1* | 5/2007 | Kuhl et al. | 370/229 |

FOREIGN PATENT DOCUMENTS

| KR | 102004 0047088 | 6/2004 |
|---|---|---|
| KR | 102004 0050755 | 6/2004 |
| KR | 102005 0034250 | 4/2005 |

\* cited by examiner

ETHERNET LINE CARD AND METHOD OF PROVIDING VARIOUS SERVICES USING THE SAME

CROSS-REFERENCE TO RELATED PATENT APPLICATION

This application claims the benefit of Korean Patent Application Nos. 10-2005-0120046, filed on Dec. 8, 2005 and 10-2006-0022260, filed on Mar. 9, 2006 in the Korean Intellectual Property Office, the disclosures of which are incorporated herein in their entirety by reference.

FIELD OF THE INVENTION

The present invention relates to an Ethernet line card and a method of providing various services using the same, and more particularly, to a Gigabit Ethernet line card having the flexibility of processing an Ethernet packet in a switch or router system using the Gigabit Ethernet as a physical medium.

DESCRIPTION OF THE RELATED ART

General Gigabit Ethernet line cards use a commercialized network processor or an exclusive application-specific integrated circuit (ASIC) for processing an individually developed Ethernet packet in order to process an Ethernet packet.

When such a general Gigabit Ethernet line card uses a commercialized network processor to process an Ethernet packet, the general Gigabit Ethernet line card can meet specifications thereof changed or added according to requirements of the market without requiring a hardware change.

However, in this case, if the capacity of the general Gigabit Ethernet line card becomes large, Ethernet packet processing performance of a line speed cannot be guaranteed. Thus, since the capacity of the general Gigabit Ethernet line card is limited, a unit price per Gigabit Ethernet port increases. In addition, since an increase of required service types, i.e., an increase of packet processing complexity, requires more time to process an Ethernet packet, the Ethernet packet processing performance decreases.

When such a conventional Gigabit Ethernet line card uses an exclusive ASIC for processing an Ethernet packet, the Ethernet packet processing performance of a line speed and the capacity of the general Gigabit Ethernet line card can be guaranteed. However, since a packet unit processing thereof is composed of the exclusive ASIC for processing an Ethernet packet, when specifications thereof are changed or added in order to meet specifications of the market, or when a new service is required, hardware thereof must be newly manufactured.

Thus, since new hardware must be newly manufactured to meet specifications or to provide service within an appropriate time, development of a new Gigabit Ethernet line card is time consuming and costly resulting in an increase in the overall price of the system.

SUMMARY OF THE INVENTION

The present invention provides an Ethernet line card solving the disadvantages of general Ethernet line cards, meeting specifications of the quickly changing Ethernet market, providing various services without requiring a hardware change, and guaranteeing the performance thereof at a line speed.

According to an aspect of the present invention, there is provided an Ethernet line card comprising: a priority allocation unit setting a priority of a received Ethernet packet according to a pre-set control standard based on header information of the Ethernet packet; a quality of service (QoS) guarantee unit defining a capacity per class based on a pre-set QoS standard, inserting the Ethernet packet into a relevant class, and dropping and managing the Ethernet packet based on the priority if the Ethernet packet exceeds a capacity of the relevant class; and a signal processing unit managing and updating the pre-set control standard and the pre-set QoS standard, receiving results of processing the Ethernet packet from the priority allocation unit and the QoS guarantee unit, and storing the received results.

The priority allocation unit may further comprise a statistics processing unit calculating statistics of the packet transmission rate per port based on the header information of the received Ethernet packet.

According to another aspect of the present invention, there is provided a method of providing various services in an Ethernet line card, the method comprising: (a) setting a priority of a received Ethernet packet according to a pre-set control standard based on header information of the Ethernet packet; (b) defining a capacity per class based on a pre-set quality of service (QoS) standard, inserting the Ethernet packet into a relevant class, and dropping and managing the Ethernet packet based on the priority if the Ethernet packet exceeds a capacity of the relevant class; and (c) managing and updating the pre-set control standard and the pre-set QoS standard, receiving results of processing the Ethernet packet from operations (a) and (b), and storing the received results.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
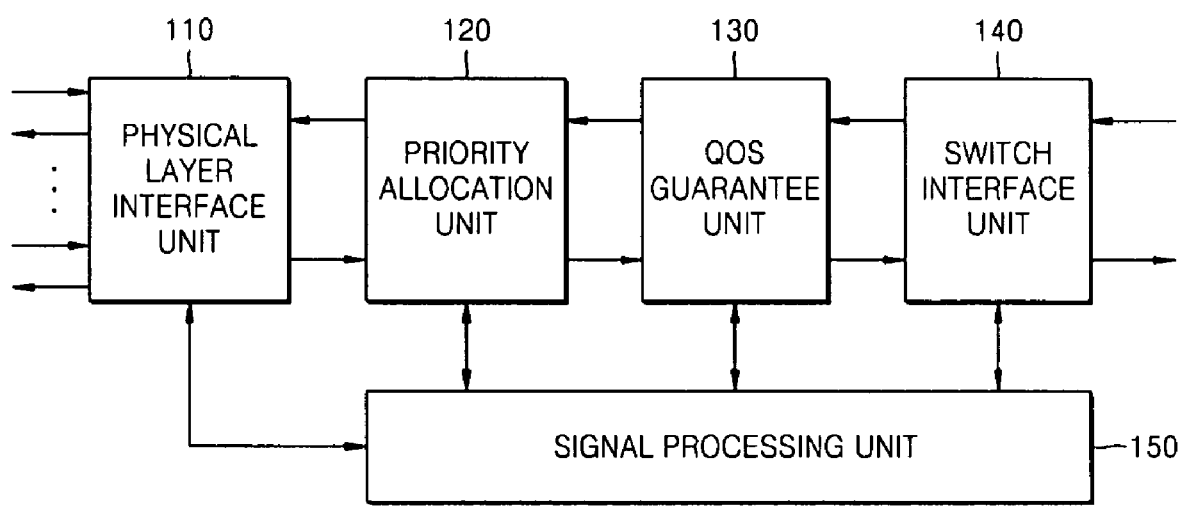
FIG. 1 illustrates a block diagram of an Ethernet line card providing various services according to an embodiment of the present invention.

Preferred embodiments of the present invention will be described herein below with reference to the accompanying drawings. In the drawings, same or similar elements are denoted by the same reference numerals even though they are depicted in different drawings. In the following description, well-known functions or constructions are not described in detail since they would obscure the invention in unnecessary detail. The invention may, however, be embodied in many different forms and should not be construed as being limited to the embodiments set forth herein; rather, these embodiments are provided so that this disclosure will be thorough and complete, and will fully convey the concept of the invention to those skilled in the art.

FIG. 1 illustrates a block diagram of an Ethernet line card providing various services according to an embodiment of the present invention.

Referring to FIG. 1, the Ethernet line card includes a physical layer interface unit 110, a priority allocation unit 120, a QoS guarantee unit 130, a switch interface unit 140, and a signal processing unit 150.

The physical layer interface unit 110 receives an Ethernet signal from an external network through a plurality of Gigabit Ethernet ports connected to an optical fiber and processes media access control (MAC) header information of the received Ethernet signal. The physical layer interface unit 110 also provides a Gigabit Ethernet MAC interface to a plurality of Gigabit Ethernet ports connected to the optical fiber and transmits a Gigabit Ethernet signal to the external network through the plurality of Gigabit Ethernet ports.

The priority allocation unit 120 performs a packet header processing and label allocating function to provide various services. In more detail, the priority allocation unit 120 sets a priority of an Ethernet packet according to a pre-set control standard based on header information of the Ethernet packet. That is, the priority allocation unit 120 classifies an Ethernet packet input from the physical layer interface unit 110 according to a service type or destination to meet various specifications of a user, allocates a priority to the Ethernet packet, and controls the Ethernet packet according to the pre-set control standard.

The priority allocation unit 120 includes a statistics processing unit (not 15 shown) calculating statistics of the packet transmission rate per port based on an Internet protocol (IP) address of the received Ethernet packet. The statistics processing unit calculates the packet transmission rate for each port, source, and destination based on a layer 2 address.

The QoS guarantee unit 130 performs a function related to QoS, such as class allocation, scheduling, and traffic management. That is, the QoS guarantee unit 130 defines the capacity per class based on a pre-set QoS standard, inserts the Ethernet packet into a relevant class, and drops and manages the Ethernet packet based on the priority if the Ethernet packet exceeds the capacity of the relevant class. If necessary, the QoS guarantee unit 130 also performs a function of processing the Ethernet packet based on the IP address and layer 3 related header information.

The switch interface unit 140 transmits the Ethernet packet processed by the QoS guarantee unit 130 and transmits an Ethernet packet input from another Ethernet line card of a system to the QoS guarantee unit 130.

The signal processing unit 150 manages and updates the pre-set control standard of the priority allocation unit 120 and the pre-set QoS standard of the QoS guarantee unit 130, receives results of processing the Ethernet packet from the priority allocation unit 120 and the QoS guarantee unit 130, and stores the received results.

The signal processing unit 150 also provides a control signal to the physical layer interface unit 110 to collect port state information from the physical layer interface unit 110 and processes Ethernet header information. The signal processing unit 150 also collects and manages the results processed by the priority allocation unit 120 and the QoS guarantee unit 130 and provides the capacity per class. The signal processing unit 150 also stores and manages failure information generated by the switch interface unit 140, outputs a stored result to a main process board (not shown) in an upper layer, and receives various control signals from the main process board.

Figure 2:
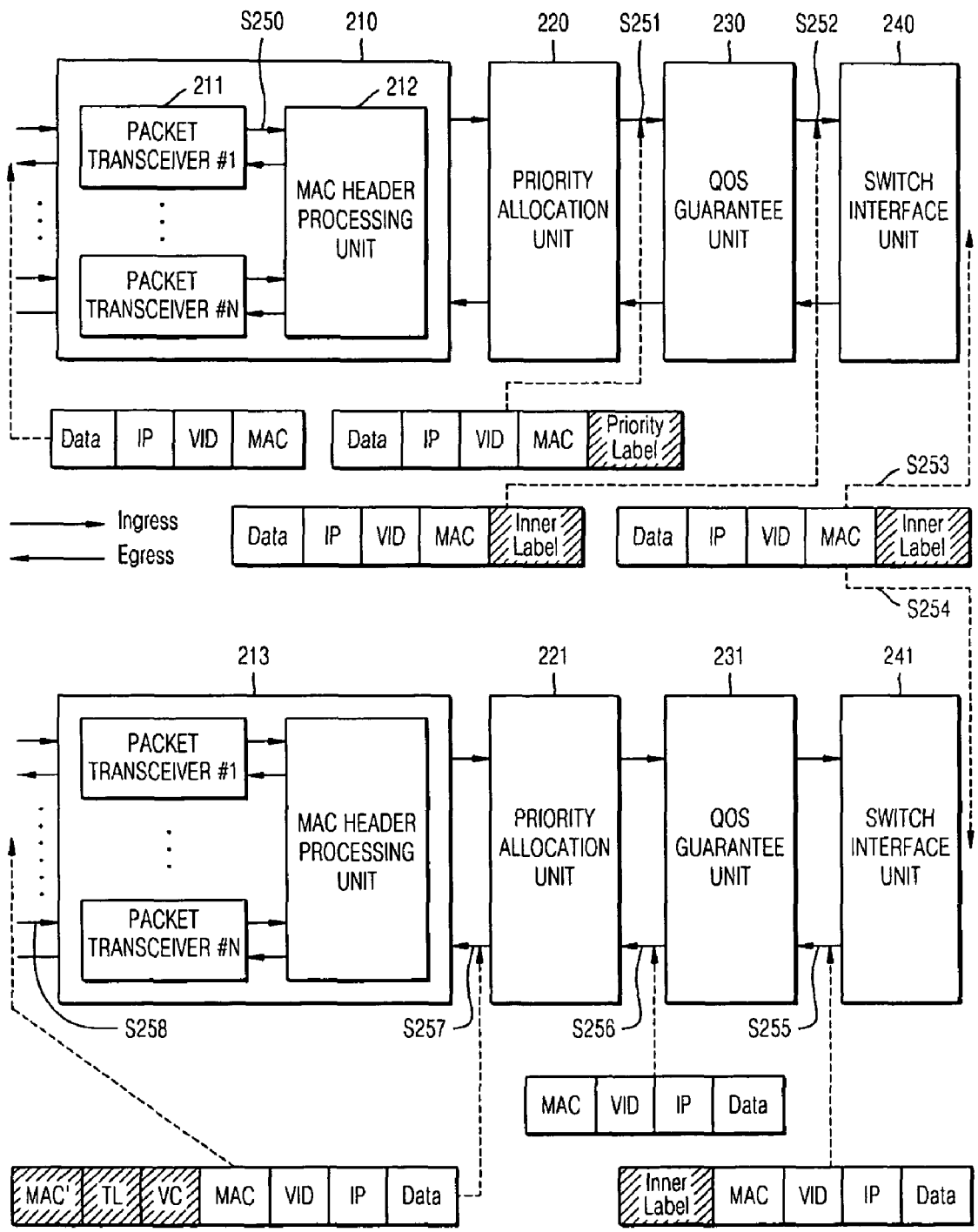
FIG. 2 illustrates a signaling diagram for providing various services of an Ethernet line card according to an embodiment of the present invention.

A method of guaranteeing the packet processing performance at a line speed and providing various services without a hardware change according to an embodiment of the present invention will now be described in more detail. FIG. 2 illustrates packet flow diagrams from ingress to egress and from egress to ingress for providing a layer 2 virtual private network (L2 VPN) service in a Gigabit Ethernet line card according to an embodiment of the present invention.

A packet flow from ingress to egress for providing the L2 VPN service will now be described.

A physical layer interface unit 210 includes a packet transceiver 211 and a MAC header processing unit 212.

When a Gigabit Ethernet packet having a virtual local area network identification (VLAN ID) is received through the ingress of the Gigabit Ethernet line card, the packet transceiver 211 optoelectric converts the received Gigabit Ethernet packet and transmits the optoelectric converted Gigabit Ethernet packet to the MAC header processing unit 212.

In operation S250, the MAC header processing unit 212 interfaces with N packet transceivers 211, generates a 125 Mbps 10-bit symbol stream by extracting a clock from the Gigabit Ethernet packet received from the packet transceiver 211 and performing a data serial-to parallel conversion, performs an auto-negotiation of the generated 10-bit symbol stream, and converts the auto-negotiated 10-bit symbol stream to 8-bit data.

The MAC header processing unit 212 provides N Gigabit Ethernet interfaces and processes MAC header information such as a pause frame. The MAC header processing unit 212 also outputs state information per port, such as loss of signal (LOS) and transmission fault (TX), to a signal processing unit (not shown).

In operation S251, a priority allocation unit 220 processes a layer 2 related label of the Gigabit Ethernet packet received from the physical layer interface unit 210, classifies the Gigabit Ethernet packet according to a service type or destination based on an IP address or the VLAN ID, allocates a priority label indicating priority to the classified Gigabit Ethernet packet according to a standard input from the signal processing unit, and outputs the priority label allocated Gigabit Ethernet packet to a QoS guarantee unit 230.

In addition, as described above, the priority allocation unit 220 performs a filtering function according to the standard defined by the signal processing unit and a function of statistics per port for the Gigabit Ethernet packet.

In operation S252, the QoS guarantee unit 230 inserts an inner label indicating an output switch port to the Gigabit Ethernet packet, determines an output order of the Gigabit Ethernet packet according to the inserted priority label, and performs a scheduling function.

The QoS guarantee unit 230 generates classes according to a standard defined by the signal processing unit, allocates the Gigabit Ethernet packet to a relevant class according to its flow, and drops and manages the Gigabit Ethernet packet based on the priority if the Gigabit Ethernet packet exceeds the capacity of the allocated class.

In operation S253, a switch interface unit 240 outputs the Gigabit Ethernet packet to a relevant switch port based on the inner label inserted by the QoS guarantee unit 230. A Gigabit Ethernet packet output from each Gigabit Ethernet line card is input to a relevant Gigabit Ethernet line card through a switch fabric card.

A packet flow from egress to ingress for providing the L2 VPN service will now be described.

In operation S255, a switch interface unit 241 outputs a Gigabit Ethernet packet input from the switch fabric card through the egress in operation S254 to a QoS guarantee unit 231. In the present embodiment, the Gigabit Ethernet packet has an inner label for determining an output port.

In operation S256, the QoS guarantee unit 231 removes the inner label from the Gigabit Ethernet packet input from the switch interface unit 241, defines the capacity per class based on a standard provided by the signal processing unit (not shown), and inserts the Gigabit Ethernet packet into a relevant class. If the Gigabit Ethernet packet exceeds the capacity of the relevant class, the QoS guarantee unit 231 drops the Gigabit Ethernet packet based on the priority.

A priority allocation unit 221 inserts a layer 2 related label into the Gigabit Ethernet packet input from the QoS guarantee unit 231 and performs a fragmentation function. In addition, the priority allocation unit 221 performs, if necessary, a MAC processing function and an address resolution protocol (ARP) function, and outputs the result to a physical layer interface unit 213 in operation S257.

The physical layer interface unit 213 performs a Gigabit Ethernet MAC matching function, electro-optically converts the Gigabit Ethernet packet input from the priority allocation unit 221, and outputs the electro-optically converted Gigabit Ethernet packet to the outside in operation S258.

The signal processing unit receives standards and control signals used for each Gigabit Ethernet line card by interfacing with a main process board (not shown) in an upper layer and outputs a result processed by each Gigabit Ethernet line card to the main process board.

Figure 3:
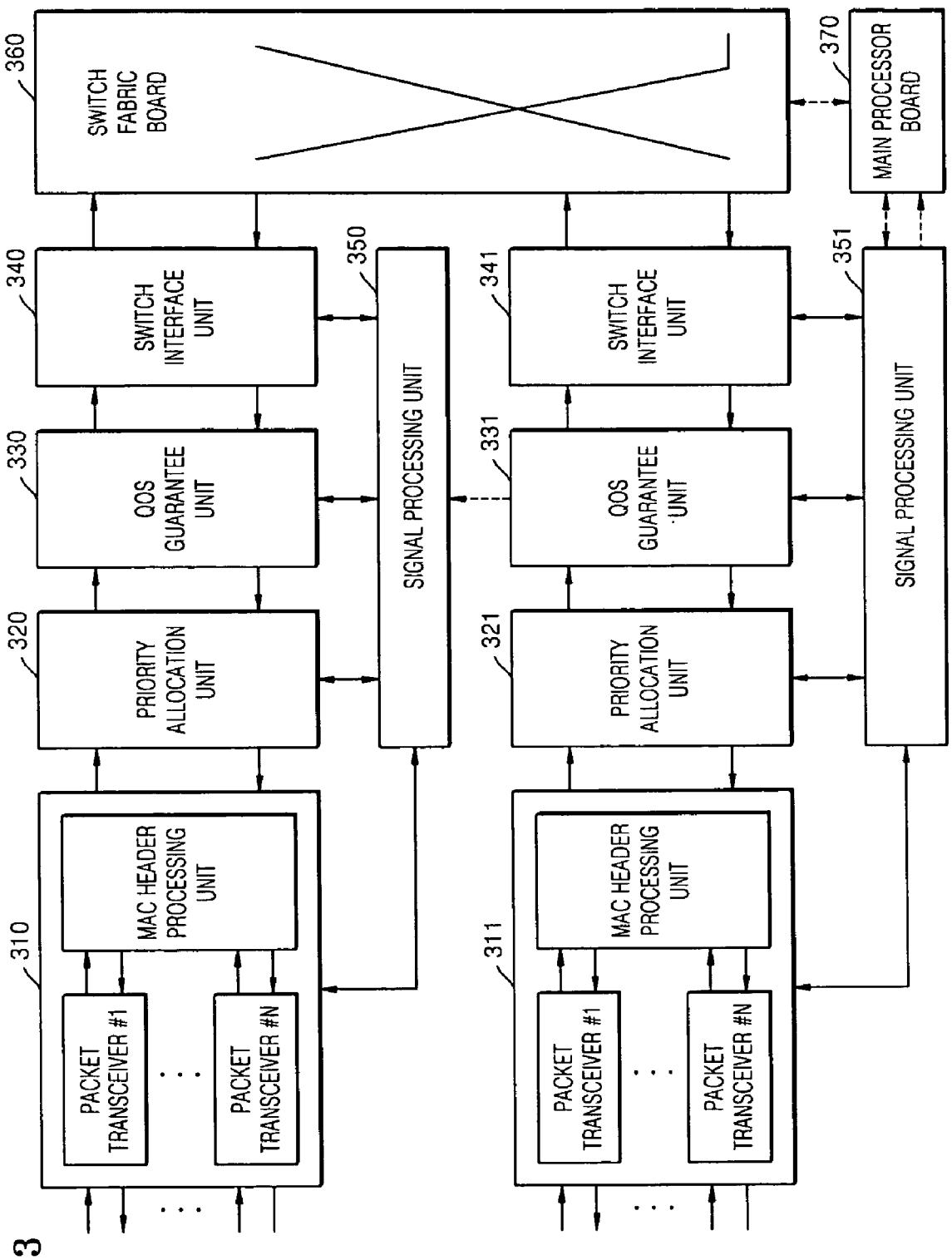
FIG. 3 illustrates a block diagram of a system to which an Ethernet line card apparatus according to an embodiment of the present invention is applied.

FIG. 3 illustrates a block diagram of a system to which an Ethernet line card apparatus according to an embodiment of the present invention is applied.

Referring to FIG. 3, an Ethernet packet received by a physical layer interface unit 310 is classified according to a service type or destination by a priority allocation unit 320, and input to a switch fabric board 360 through a QoS guarantee unit 330 and a switch interface unit 340.

The switch fabric board 360 is controlled by a main process board 370 and provides a function of switching between N Gigabit Ethernet line cards. The main process board 370 is located outside of the N Gigabit Ethernet line cards and controls each of the N Gigabit Ethernet line cards. By doing this, the bandwidth of a total system can be effectively managed by simultaneously managing the capacity of Ethernet packets having the same destination among Ethernet packets classified according to a service type and destination by the N Gigabit Ethernet line cards.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, according to the embodiment of the present invention, an Ethernet line card can satisfy requirements of the quickly changing Ethernet market without a hardware change.

That is, since the Ethernet line card can provide various services without a hardware change, the requirements of the quickly changing Ethernet market can be satisfied at any given time, and the performance of a line speed can be guaranteed by separating label processing and statistics processing, which are time consuming, traffic management wise.

In addition, unit price per port can be reduced by increasing the number of ports per Ethernet line card while guaranteeing the performance of a line speed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An Ethernet line card comprising:
   a priority allocation unit
      setting a priority of a received Ethernet packet according to a pre-set control standard based on header information of the Ethernet packet by allocating a priority label into the Ethernet packet,
      performing a filtering function in accordance to a function of statistics per port for the Ethernet packet;
   a quality of service (QoS) guarantee unit
      defining a capacity per class based on a pre-set QoS standard,
      determining an output order of the Ethernet packet in accordance to the allocated priority label,
      inserting into the Ethernet packet an inner label indicating a relevant output switch port, and
      dropping and managing the Ethernet packet based on the priority label when the Ethernet packet exceeds a capacity of a relevant class;
   a switch interface unit
      outputting the Ethernet packet to a relevant switch port based on the inner label inserted in the Ethernet packet; and
   a signal processing unit
      managing and updating the pre-set control standard and the pre-set QoS standard,
      receiving results of processing the Ethernet packet from the priority allocation unit and the QoS guarantee unit, and
      storing the received results.

2. The Ethernet line card of claim 1, further comprising a physical interface unit transmitting/receiving an control signal through at least one Ethernet port, extracting Ethernet header information from the control signal, and processing the extracted Ethernet header information.

3. The Ethernet line card of claim 1, wherein the switch interface unit receiving the Ethernet packet, having the inner label, processed by the QoS guarantee unit, and transmitting the Ethernet packet.

4. The Ethernet line card of claim 1, wherein the priority allocation unit inserts a layer 2 label into the Ethernet packet when a service required to the Ethernet packet is performed.

5. The Ethernet line card of claim 4, wherein the priority allocation unit further comprises a statistics processing unit calculating statistics of a packet transmission rate per port based on a header information of the Ethernet packet or the layer 2 label.

6. The Ethernet line card of claim 1, wherein the signal processing unit stores and manages state information of an Ethernet port through which the control signal is received based on an Ethernet header information and transmits processing results of the Ethernet packet, which are received from the priority allocation unit and the QoS guarantee unit.

7. A method of providing various services in an Ethernet line card, the method comprising:
   setting a priority of a received Ethernet packet according to a pre-set control standard based on header information of the Ethernet packet by allocating a priority label into the Ethernet packet;
   defining a capacity per class based on a pre-set quality of service (QoS) standard;
   performing a filtering function in accordance to a function of statistics per port for the Ethernet packet;
   determining an output order of the Ethernet packet in accordance to the allocated priority label;
   inserting an inner label indicating a relevant output switch port into the Ethernet packet;

outputting the Ethernet packet to a relevant switch port based on the inner label inserted in the Ethernet packet;

dropping and managing the Ethernet packet based on the priority if the Ethernet packet exceeds a capacity of a relevant class; and managing and updating the pre-set control standard and the pre-set QoS standard, receiving results of processing the Ethernet packet, and storing the received results.

8. The method of claim 7, further comprising:

transmitting/receiving the Ethernet packet through at least one port;

extracting layer 2 header information from the Ethernet packet; and processing the extracted layer 2 header information.

9. The method of claim 8, wherein setting operation further comprises calculating statistics of a packet transmission rate per port based on header information of the Ethernet packet or layer 2 header information.

10. The method of claim 7, wherein the managing and updating operation further comprises storing and managing state information of an Ethernet port through which the Ethernet packet is received based on Ethernet header information and transmitting processing results of the Ethernet packet, which are received from the setting and defining operations.

11. A computer readable recording medium having instructions that carry out a method of providing various services in an Ethernet line card, wherein the method comprising the steps of:

setting a priority of a received Ethernet packet according to a pre-set control standard based on header information of the Ethernet packet by allocating a priority label into the Ethernet packet;

defining a capacity per class based on a pre-set quality of service (QoS) standard;

performing a filtering function in accordance to a function of statistics per port for the Ethernet packet;

determining an output order of the Ethernet packet in accordance to the allocated priority label;

inserting an inner label indicating a relevant output switch port into the Ethernet packet;

outputting the Ethernet packet to a relevant switch port based on the inner label inserted in the Ethernet packet;

dropping and managing the Ethernet packet based on the priority if the Ethernet packet exceeds a capacity of a relevant class; and managing and updating the pre-set control standard and the pre-set QoS standard, receiving results of processing the Ethernet packet, and storing the received results.

12. The computer readable recording medium having instructions that carry out a method of providing various services in an Ethernet line card of claim 11, the method further comprising:

transmitting/receiving the Ethernet packet through at least one port;

extracting layer 2 header information from the Ethernet packet; and processing the extracted layer 2 header information.

13. The computer recording medium having instructions that carry out a method of providing various services in an Ethernet line card of claim 11, wherein the setting operation further comprises calculating statistics of a packet transmission rate per port based on header information of the Ethernet packet or layer 2 header information.

14. The computer recording medium having instructions that carry out a method of providing various services in an Ethernet line card of claim 11, wherein the managing and updating operation further comprises storing and managing state information of an Ethernet port through which the Ethernet packet is received based on Ethernet header information and transmitting processing results of the Ethernet packet, which are received from the setting and defining operations.

15. The computer recording medium having instructions that carry out a method of providing various services in an Ethernet line card of claim 11, wherein the computer readable recording medium is selected from a group consisting of read-only memory (ROM), random-access memory (RAM), CD-ROMs, magnetic tapes, floppy disks, and optical data storage devices.

16. The computer recording medium having instructions that carry out a method of providing various services in an Ethernet line card of claim 11, wherein the computer readable recording medium is distributed over a network of coupled computer systems so that the instructions of the computer readable recording medium is stored and executed in a distributed fashion.

* * * * *